United States Patent
Errington et al.

(10) Patent No.: US 7,275,378 B2
(45) Date of Patent: Oct. 2, 2007

(54) SPEED AND SYSTEM PRESSURE CONTROL FOR COOLING FAN

(75) Inventors: Bradley C. Errington, Bellefontaine, OH (US); Daniel Yelles, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 10/970,503

(22) Filed: Oct. 21, 2004

(65) Prior Publication Data

US 2006/0086113 A1  Apr. 27, 2006

(51) Int. Cl.
- B60H 1/32 (2006.01)
- F25D 17/00 (2006.01)
- F25B 39/04 (2006.01)

(52) U.S. Cl. .............................. 62/133; 62/181; 62/183

(58) Field of Classification Search .................. 62/133, 62/178, 180, 181, 183
See application file for complete search history.

(56) References Cited

U.S. PATENT DOCUMENTS

| | | |
|---|---|---|
| 5,133,302 A | 7/1992 | Yamada et al. |
| 5,419,149 A | 5/1995 | Hara et al. |
| 6,823,681 B2 * | 11/2004 | Hirose et al. .................. 62/133 |
| 7,021,071 B2 * | 4/2006 | Kim ............................. 62/178 |
| 2004/0016246 A1 * | 1/2004 | Furukawa et al. ............ 62/183 |
| 2004/0040319 A1 * | 3/2004 | Lee ............................... 62/133 |
| 2006/0005552 A1 * | 1/2006 | Anyoji et al. .................. 62/133 |

* cited by examiner

*Primary Examiner*—Marc Norman
(74) *Attorney, Agent, or Firm*—Rankin, Hill, Porter & Clark LLP; Mark E. Duell

(57) ABSTRACT

A method and system for controlling a cooling fan that cooperates with an air conditioning condenser in a vehicle. The present embodiments include steps and corresponding implementations for determining a speed of the vehicle, determining a discharge pressure of the air conditioning condenser, determining an ambient temperature of air surrounding the vehicle and determining an outlet temperature of a vehicle air conditioning system. The cooling fan is operated in one or more desired fan speed modes corresponding to one or more respective discharge pressure ranges. The fan speed modes are a function of vehicle speed and one or more of ambient temperature, outlet temperature, and discharge pressure.

14 Claims, 10 Drawing Sheets

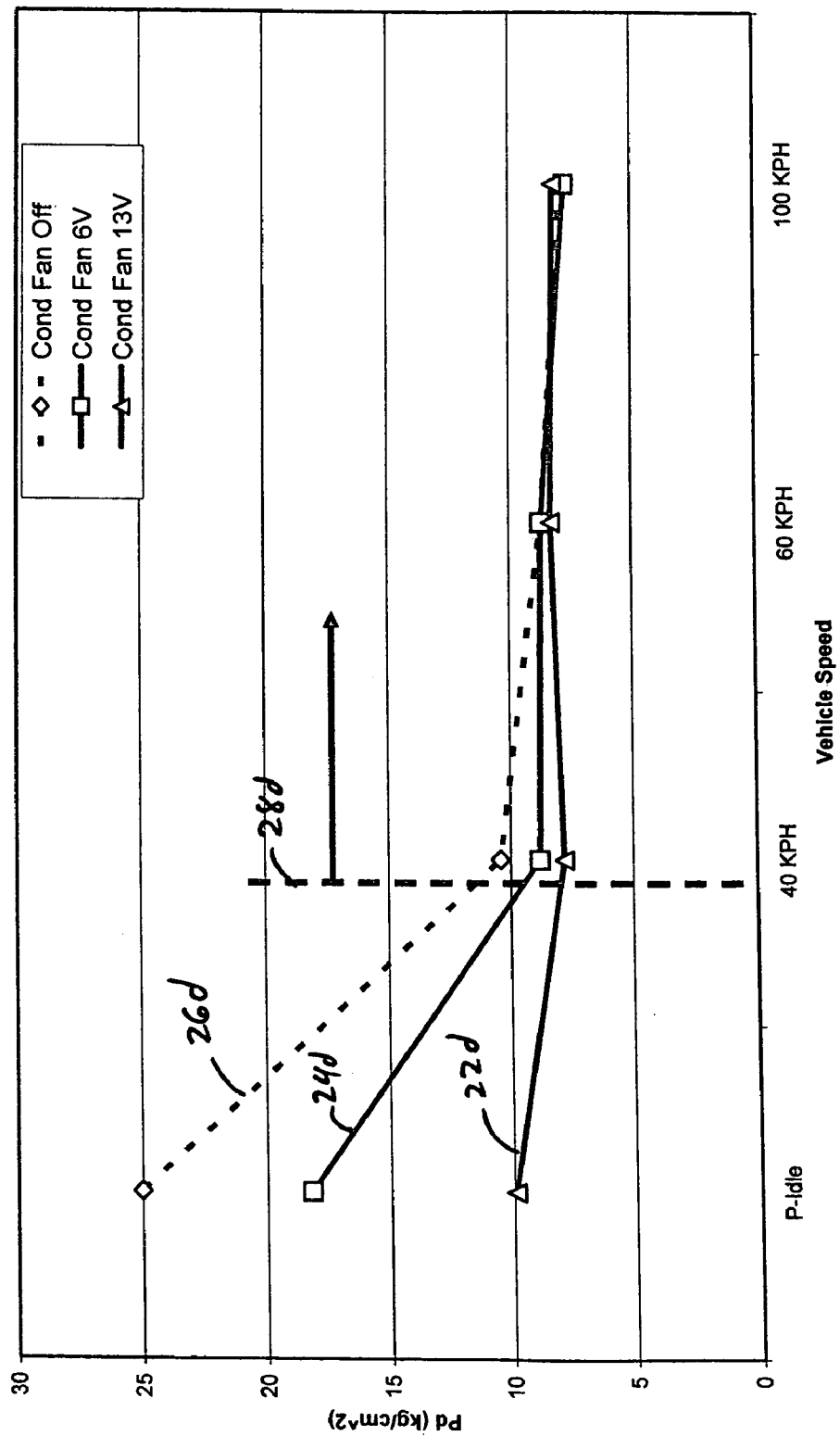

SPEED AND SYSTEM PRESSURE CONTROL FOR COOLING FAN

BACKGROUND OF THE INVENTION

1. Field of the Invention

The present invention is directed to the field of cooling fans, particularly those of the type used with air conditioning condensers and radiators in automobiles and other types of vehicles.

2. Description of Related Art

In an air conditioning or other type of refrigeration system, a condenser is used to eliminate waste heat generated from the cooling process. A basic air conditioning system includes a compressor and an expansion valve. A condenser is typically a coiled arrangement of tubes, downstream of a refrigerant compressor and upstream of an expansion valve. An evaporator is a similar coiled arrangement of tubes, downstream of the expansion valve and upstream of the compressor. The condenser and evaporator are in fluid connection, and contain a refrigerant, which is a highly volatile liquid, i.e. a liquid having a very low specific heat of evaporation.

As refrigerant pressure is built up in the condenser, heat is produced, as is understood from the Idea Gas Law. Preferably, the condenser is cooled down as close as possible to ambient temperature. Upon throttling through the expansion valve, preferably a venturi or the like, the refrigerant expands into the evaporator, thereby cooling down, as is also understood from the Ideal Gas Law. Air is cooled by passing over the evaporator, resulting in refrigeration or air conditioning.

In order to efficiently eliminate the heat produced in the condenser, it is typical to use a fan to induce a flow of ambient temperature air over the condenser coils, so as to increase the rate of heat transfer from the coils to the ambient temperature. In a common vehicle design, the condenser is mounted next to the radiator of the engine cooling system, and a common condenser/radiator fan is used, electrically powered by the vehicle's alternator. However, the condenser/radiator fan is typically located in the front of the vehicle, in the path of the air flow produced by the vehicle's forward motion. As a result, this air flow is also in contact with the condenser, thereby producing an air flow cooling effect in addition to the cooling produced by the fan. This effect varies with the speed of the vehicle. At low vehicle speeds, the air flow cooling makes a small contribution. As vehicle speed increases, the air flow cooling effect is greater. At high speeds, under certain environmental conditions, the air flow cooling alone is sufficient to produce the required condenser cooling, thereby making the fan superfluous. However, in a typical vehicle air conditioning system, the condenser/radiator fan is designed to operate continuously with the operation of the air conditioning system. This places an additional load on the alternator's electrical output, which translates directly into the load on the vehicle's engine. So the fan's operation directly reduces the overall fuel efficiency of the vehicle.

Several factors influence the load placed on the condenser, and thus the efficiency of the air flow cooling effect as related to the operation of the condenser/radiator fan system. For example, the air conditioning load may vary in accordance with ambient temperature, solar load, relative humidity, vehicle speed and the user set point for the air conditioning system. Also, air flow cooling of the condenser can be influenced by the same environmental conditions. Further, these conditions can vary with variations in the weather, and even with varying traffic conditions, as vehicle speed changes. Thus, there has heretofore been no option but to continue to allow the condenser/radiator fan to continuously operate with the air conditioning system.

Therefore, there exists a need in the art for a method and system to control the condenser/radiator fan operation in response to operating conditions of the vehicle.

SUMMARY OF THE INVENTION

The difficulties and drawbacks associated with previous-type systems are overcome in the present method and apparatus for controlling a condenser/radiator fan that cooperates with an air conditioning condenser in a vehicle. The present embodiments include steps and corresponding implementations for determining a speed of the vehicle, determining a discharge pressure of the air conditioning condenser, determining an ambient temperature of air surrounding the vehicle and determining an outlet temperature of a vehicle air conditioning system. The condenser/radiator fan is operated in one or more desired fan speed modes corresponding to one or more respective discharge pressure ranges. The condenser/radiator fan speed modes are a function of vehicle speed and one or more of ambient temperature, outlet temperature and discharge pressure.

BRIEF DESCRIPTION OF THE DRAWINGS

These and further features of the invention will be apparent with reference to the following description and drawings, wherein:

FIGS. 3A, 3B, 3C, 3D, 3E, 3F and 3G are graphs illustrating the relationship between condenser/radiator fan operating speed, condenser discharge pressure, and vehicle speed; and, FIG. 4 schematically illustrates a vehicle incorporating the condenser/radiator fan control system of the present invention.

DETAILED DESCRIPTION OF THE PREFERRED EMBODIMENTS

In the present invention, the operation of a vehicle condenser/radiator fan and the attendant power consumption are controlled by a computer implemented method employing a novel algorithm, as will be appreciated from the subsequent disclosure. In its most essential form, the present method comprises the steps of determining a speed of the vehicle, determining a refrigerant discharge pressure of the air conditioning condenser (an indicator of air conditioner operation), and controlling the operative state of the condenser fan as a function of vehicle speed and discharge pressure. The present method also takes into account measurements of a number of other environmental and operational factors, as will be shown in detail hereinbelow. It should be appreciated that at least some of these measurements are preferably made using standard type sensors, such as would occur to those having skill in the art.

Figure 4:
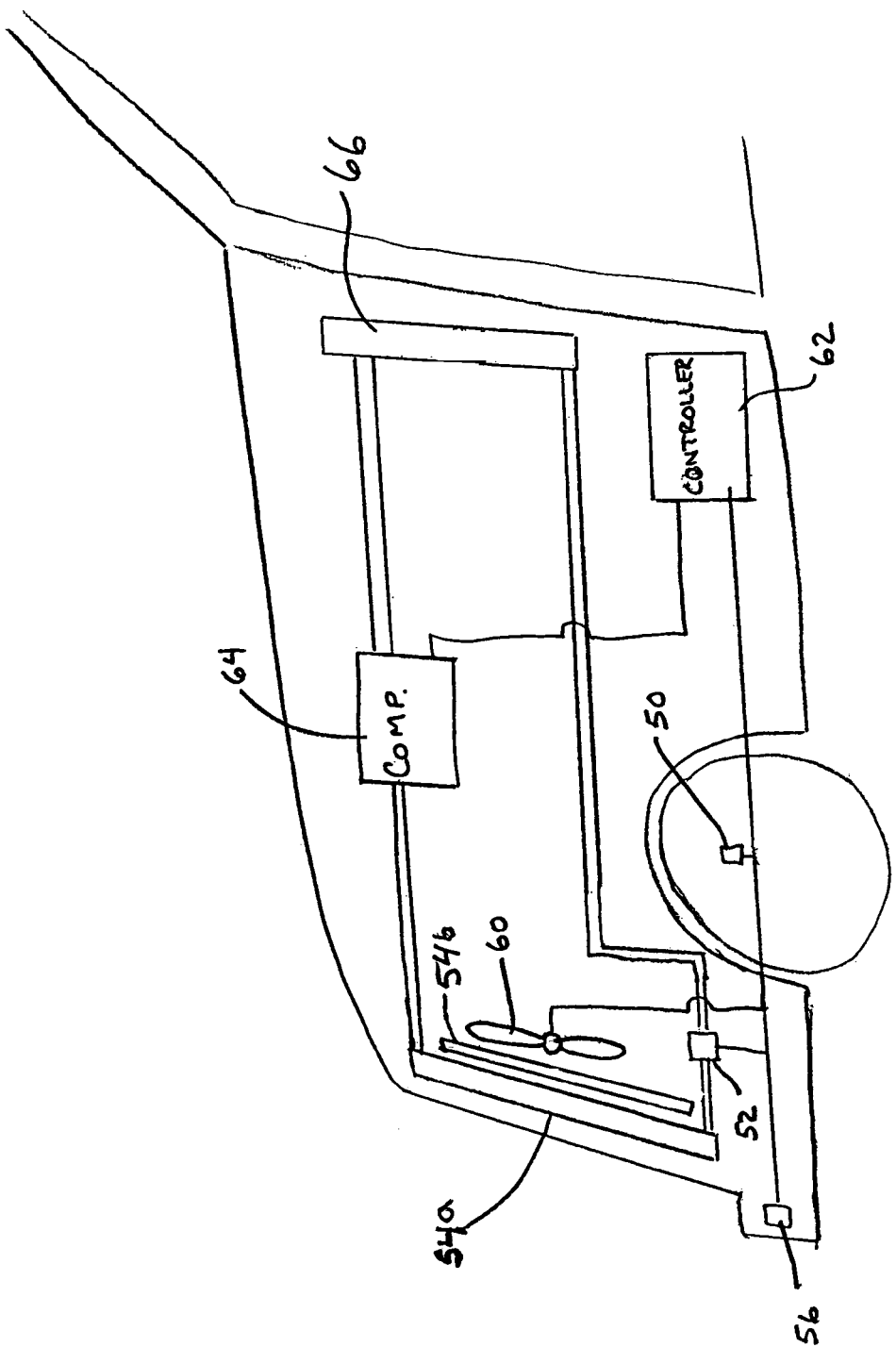

For example, and with reference to FIG. 4, a speed sensor 50 may be part of an ABS (anti-lock brake system) in cars.

Refrigerant pressure at the condenser discharge or outlet can be measured by a pressure sensor 52 disposed in the refrigerant line adjacent to the condenser 54a. Ambient air temperature is measured with a temperature sensor 56, which is conventionally disposed within the front bumper of the vehicle. The condenser 54a is disposed in line with the radiator 54b at the front of the vehicle. One or more, preferably two, condenser/radiator fans 60 are disposed behind the radiator 54b, and are electronically controlled by a controller 62. The compressor 64 and evaporator 66 are schematically shown in FIG. 4. As will be appreciated from the following discussion, signals from the sensors 50, 52, 56 are provided to the controller 62 and are used by the controller 62 in accordance with the control algorithm of the present invention, in order to control operation of the condenser/radiator fan 60. A discussion follows herewith of variations of condenser air flow cooling with respect to vehicle speed, as related to ambient temperature and condenser refrigerant discharge pressure, with a demonstration of how fan operation can be regulated with the present method in response to these variables.

Figure 2:
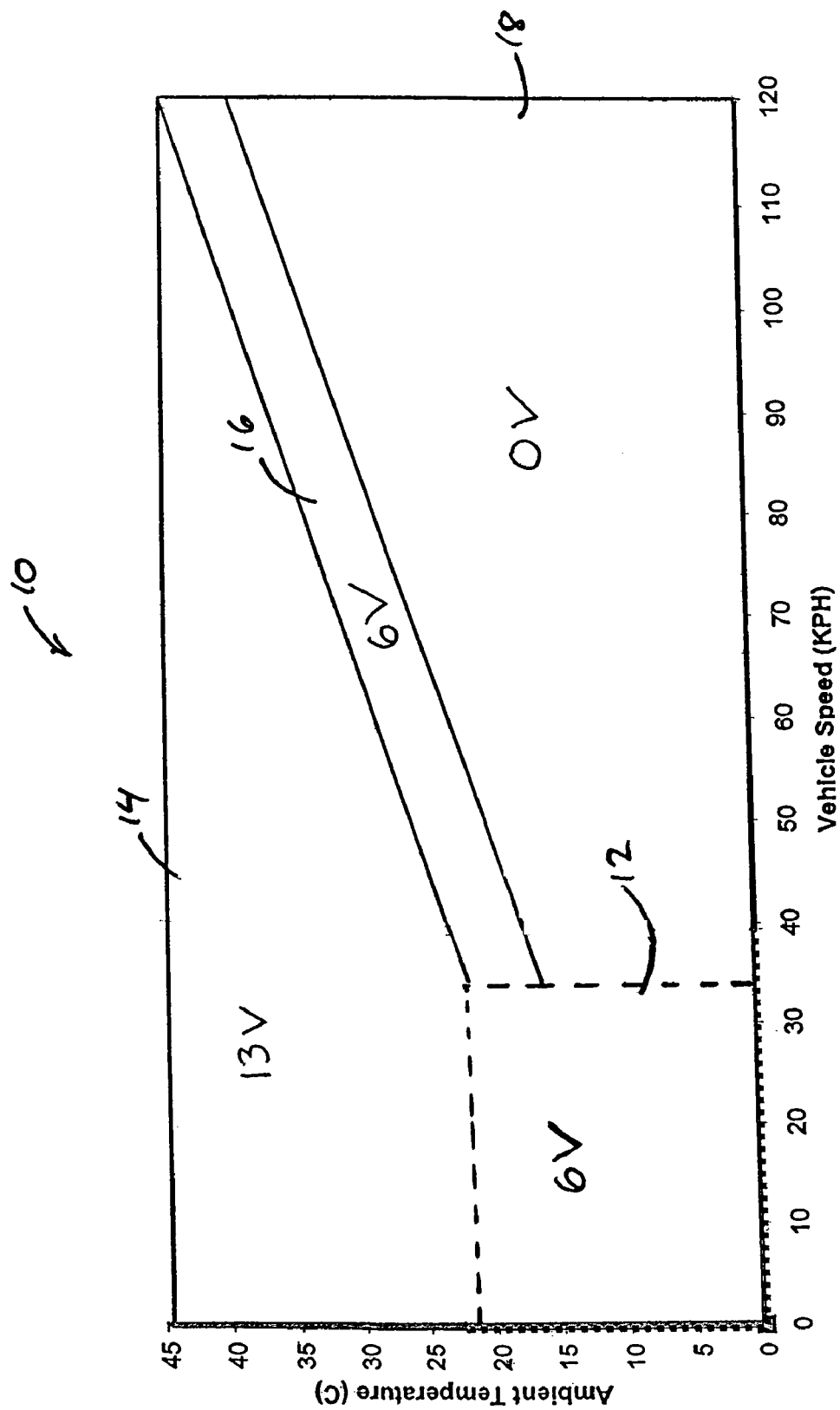
FIG. 2 is a graph illustrating condenser/radiator fan operation according to another preferred embodiment of the present invention.

FIG. 2 is a graph 10 showing a generalized relationship between vehicle speed (Vs), ambient temperature (Tam), and condenser/radiator fan speed (CFs) (i.e. applied voltage) in providing additional air flow cooling to the air conditioning condenser 54a. In this regard it is noted that the condenser/radiator fan speed is directly related to applied voltage (e.g., 0V, 6V, 13V), and is operable at any one of a plurality of speeds based upon the voltage.

At relatively low speeds and low ambient temperatures, there is a first region 12 where operation of the condenser/radiator fan 60 should be operated at high speed (13V) for adequate cooling, but nevertheless, the condenser/radiator fan is operated at a low speed (6V) for noise reduction. This range is from speeds of about 0 to 35 KPH and temperatures from about 0 to 22° C. Operation of the condenser/radiator fan at this low speed balances the interests of fuel efficiency and air conditioning performance, in order to obtain the noise benefit.

At comparable speeds but higher temperatures, e.g. above 22° C., there is a second region 14 of conditions where the condenser/radiator fan 60 is operated at a high speed setting (i.e. 13V) in order to provide improved condenser cooling, which results in better air conditioning performance but increased fuel consumption. At higher speeds and temperatures, there is a third region 16 where air flow cooling partially offsets the condenser/radiator fan operation, allowing low speed (6V) fan operation. This third region 16 falls in an intermediate temperature range of between about 18 to 23° C. at 35 KPH and increases linearly with vehicle speed to between about 40 to 45° C. at 120 KPH. For higher temperatures within this vehicle speed range, the air flow does not make a significant contribution to condenser cooling, and the fan 60 must be operated in the second region 14, i.e. at the high speed (13V), in order to maintain sufficient condenser cooling.

However, for temperatures below those of the third region 16, there is a fourth region of conditions 18 where air flow cooling eliminates the need for air flow from the condenser/radiator fan 60. In this fourth region 18, the condenser/radiator fan 60 may be shut off (i.e. operated at 0V). This region is below about 18° C. at 35 KPH and increases linearly to about 40° C. at 120 KPH. It is believed to be apparent that a great percentage of vehicle operation is within this fourth region 18, especially most highway driving.

Figure 3A:
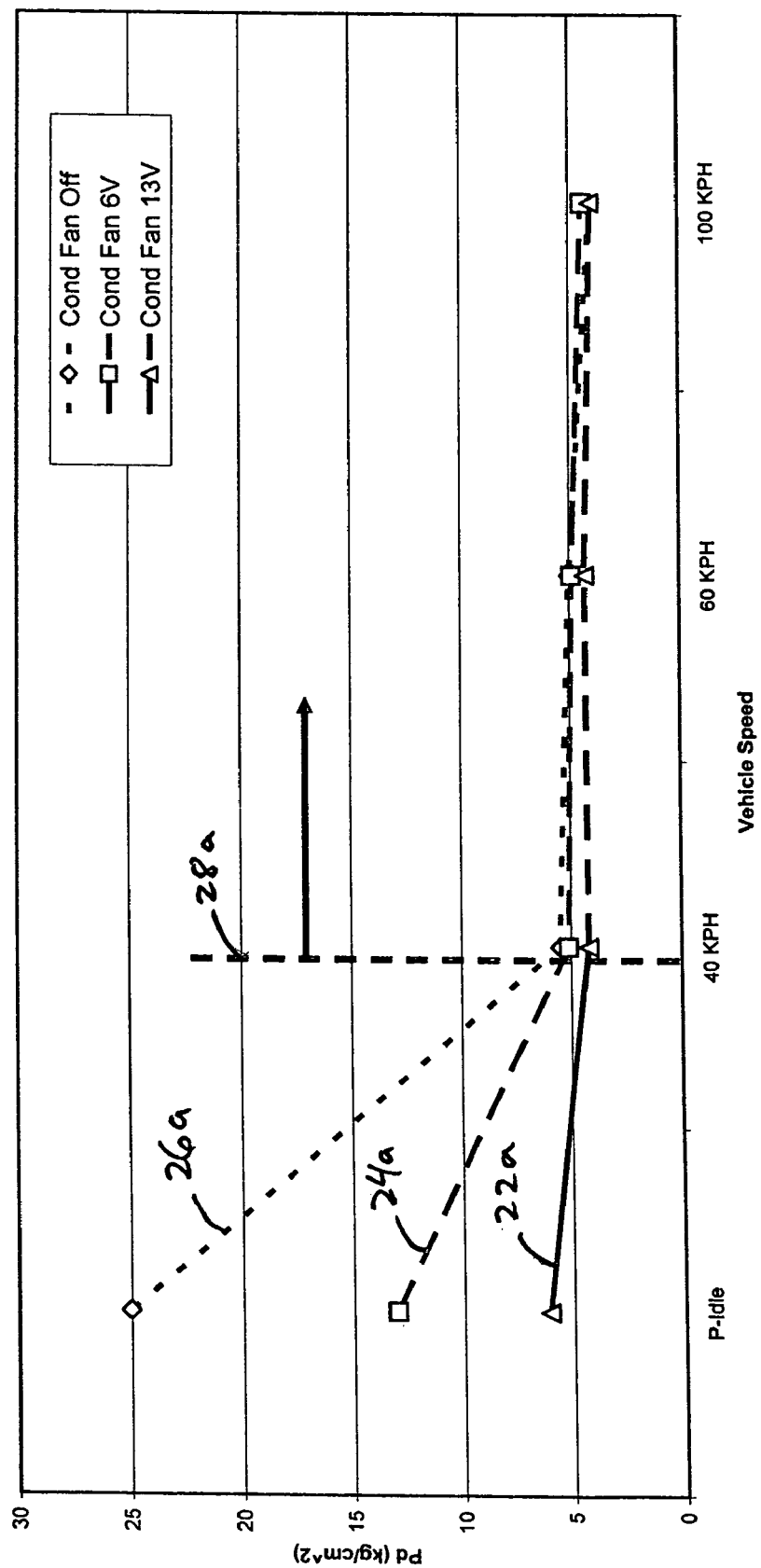
Figure 3B:
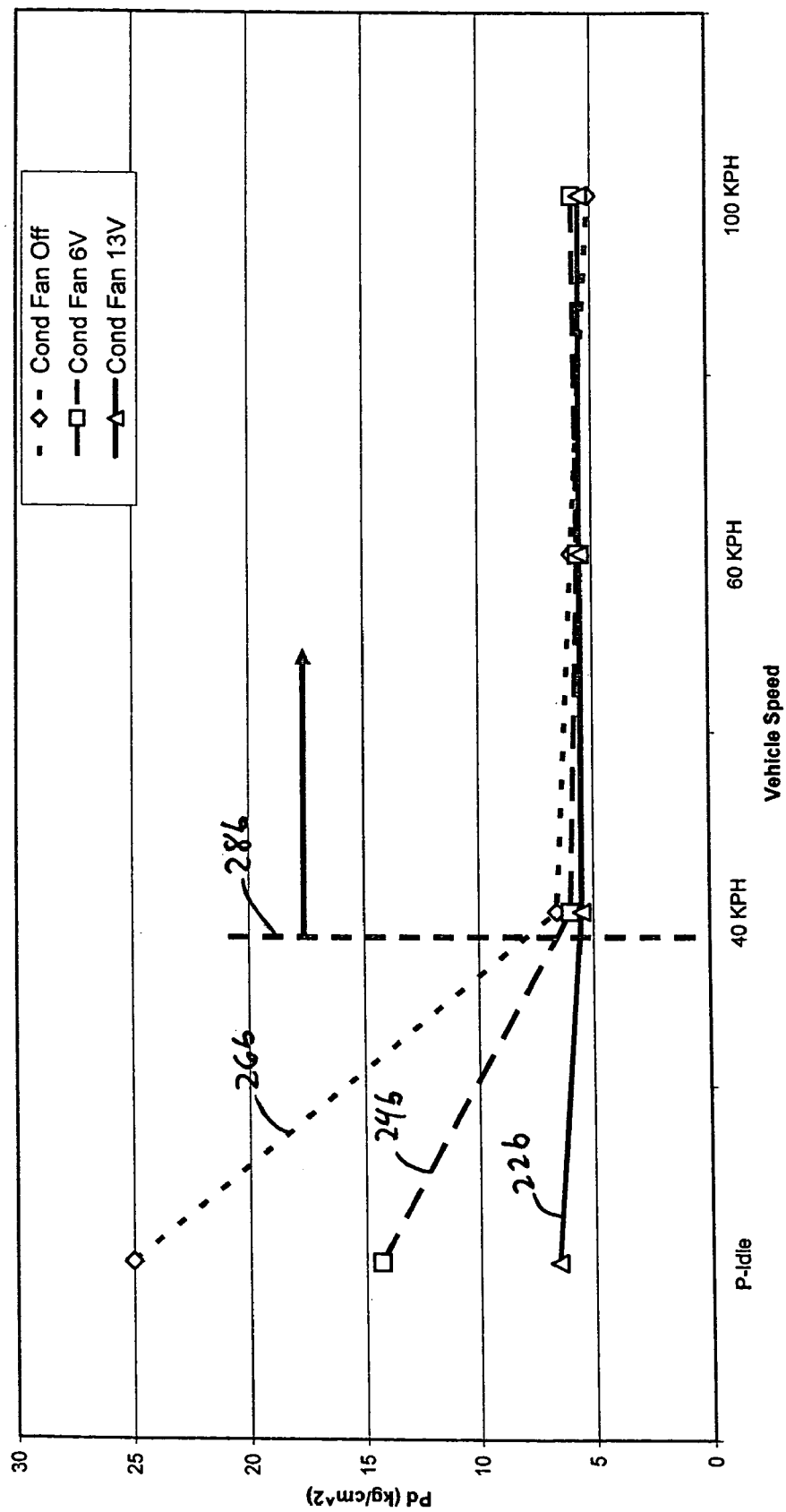
Figure 3C:
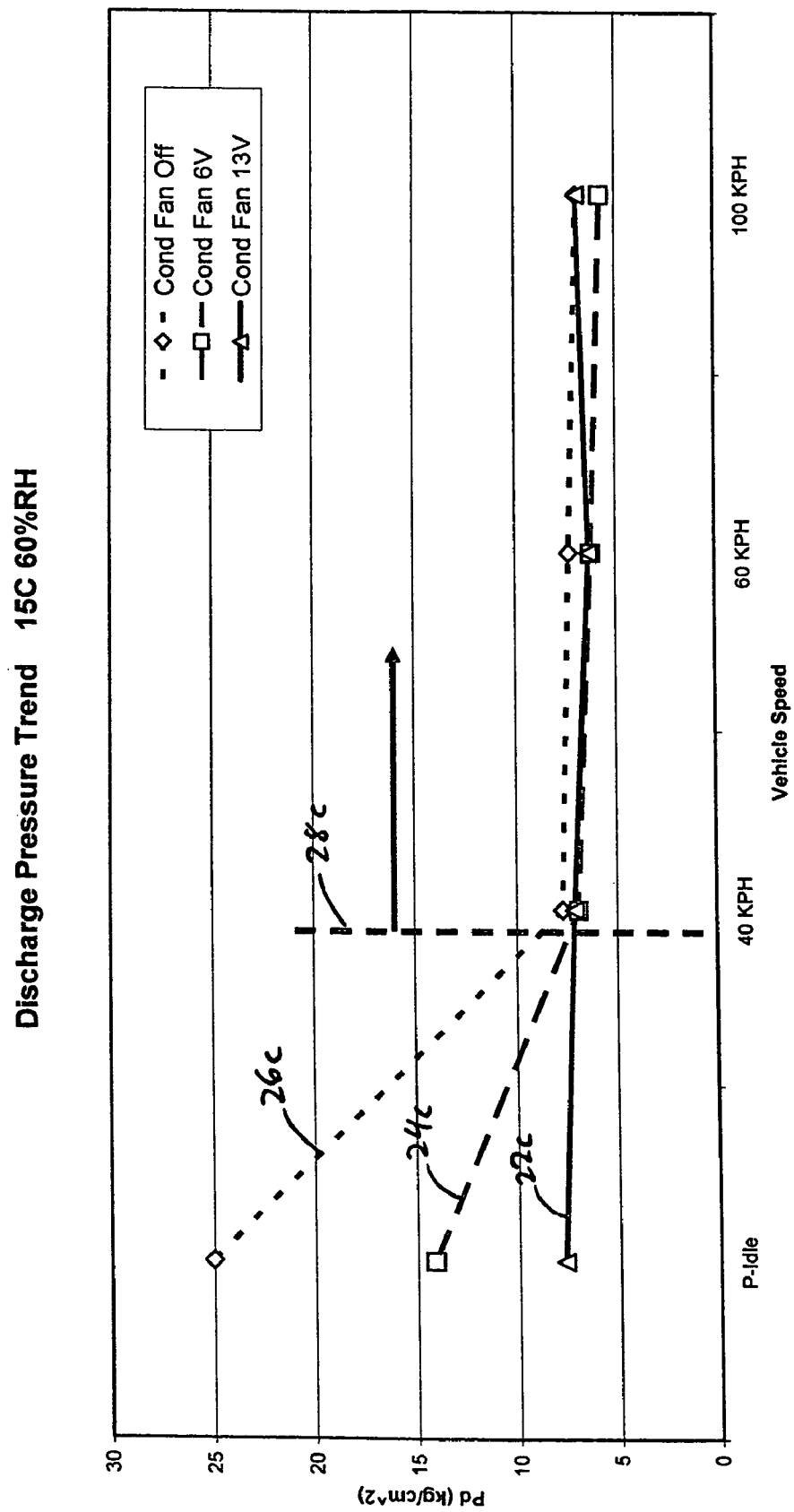
Figure 3E:
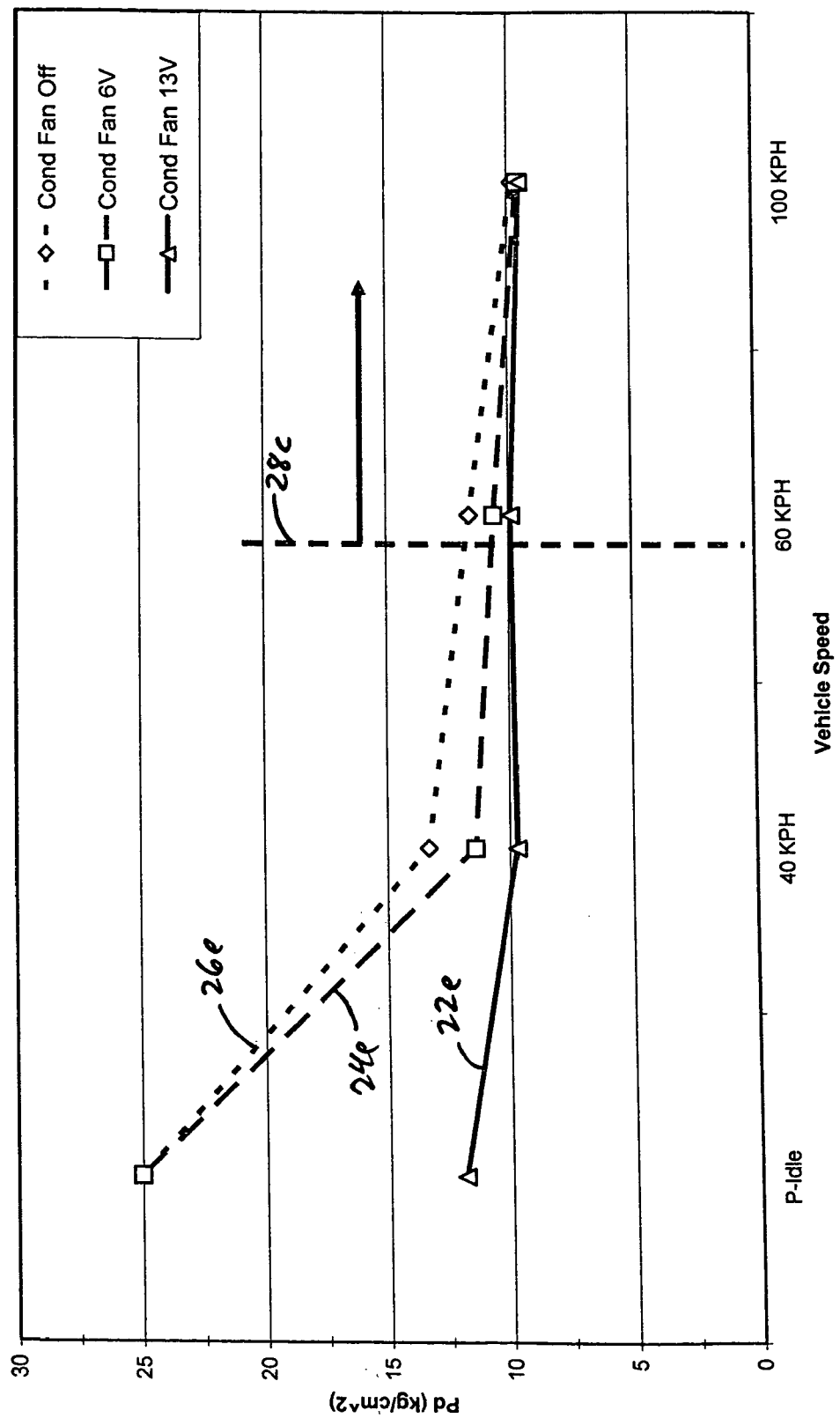
Figure 3F:
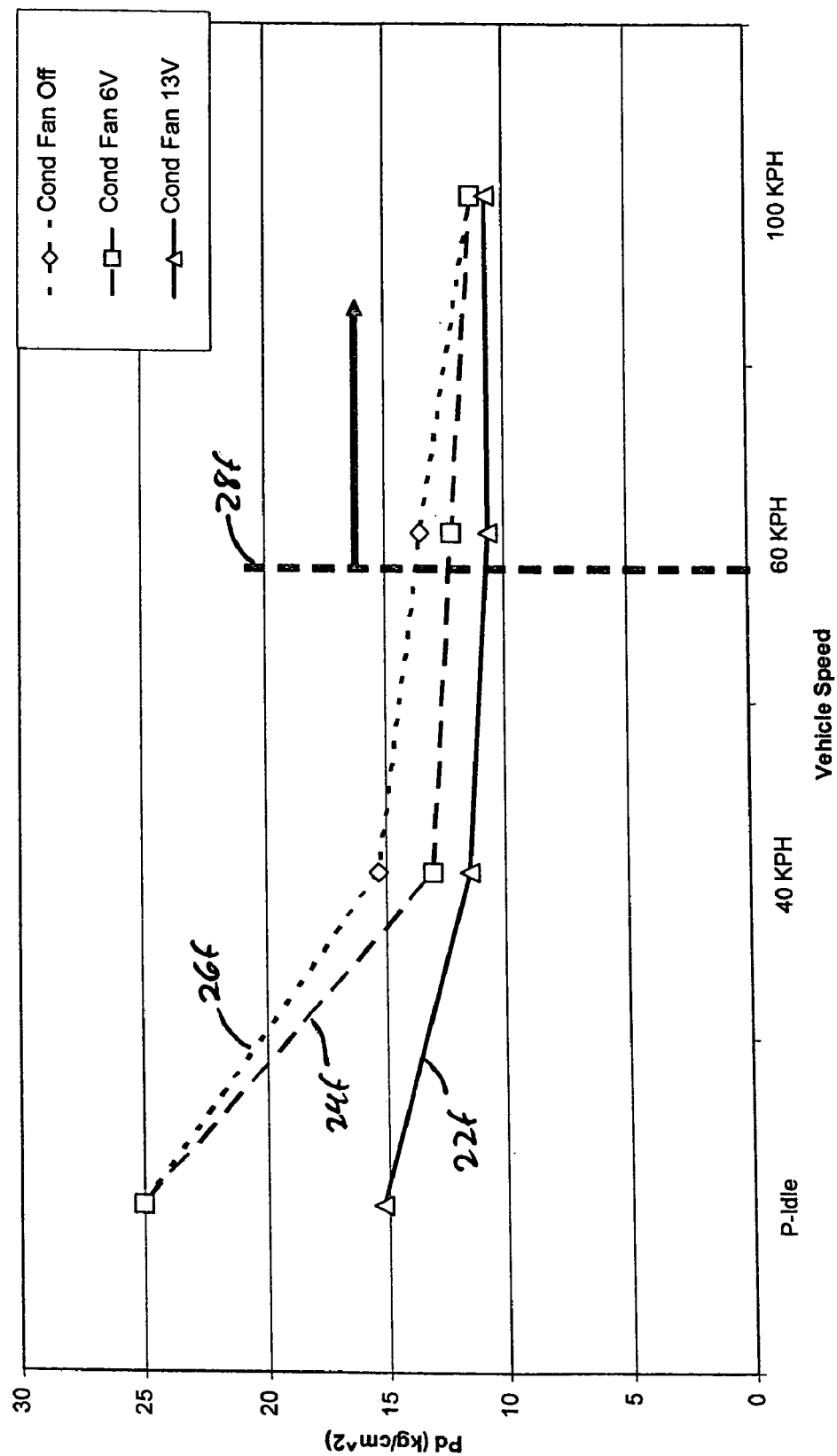
Figure 3G:
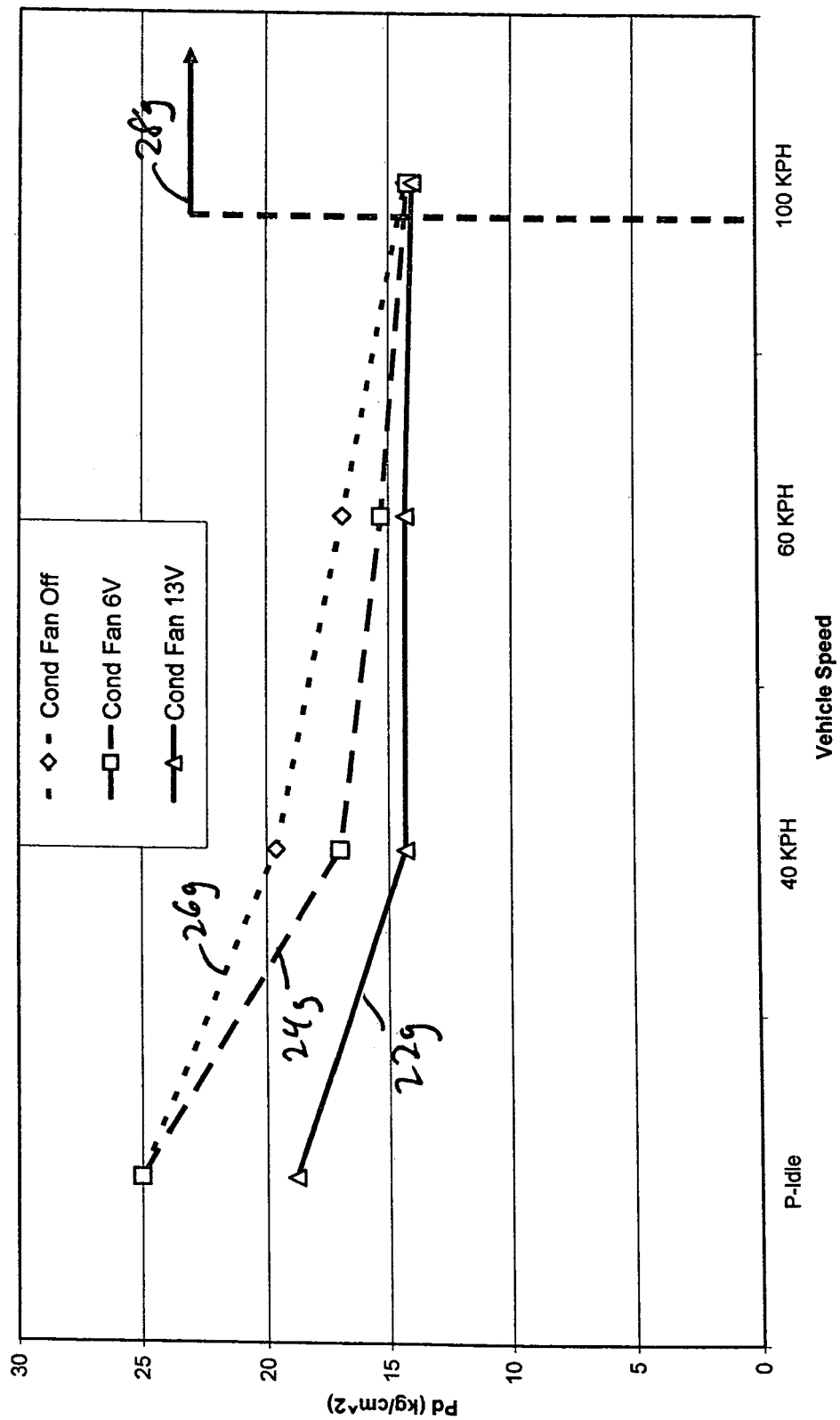

FIGS. 3A-3G are graphs showing the relationship between vehicle speed (Vs) and condenser discharge pressure (Pd), which is an indicator of operational load on the air conditioning system. FIGS. 3A-3F illustrate the relationship between vehicle speed and condenser discharge pressure at various temperatures and 60% relative humidity, while FIG. 3G shows the relationship between vehicle speed and condenser discharge pressure at 40° C. and 20% relative humidity.

In each of FIGS. 3A-3G, a high speed plot (indicated by a solid line with a "triangle" shape) shows the vehicle speed and condenser discharge pressure ranges during operation of the condenser/radiator fan at high speed (13V). A low speed plot (indicated by a dashed line with a "square" shape) displays the ranges of vehicle speed and condenser discharge pressure where the condenser/radiator fan is operated at a low speed (6V). An off plot (indicated by a dotted line with a "diamond" shape) shows the values of vehicle speed and condenser discharge pressure when the condenser fan is off (0V). As generally shown in FIGS. 3A-3G, when the vehicle speed increases, the condenser refrigerant discharge pressure decreases, and there is a reduced need for condenser cooling by operation of the condenser/radiator fan 60. At a certain speed (varying with temperature) the plots converge, indicating that operation of the condenser/radiator fan offers little or no benefit for cooling, while still being a drag on fuel efficiency.

FIG. 3A shows the trend in discharge pressure (Pd) as a function of vehicle speed (Vs) at 5° C. with 60% relative humidity. In the P-Idle condition (i.e. when a vehicle is idling in park), the high speed plot 22a indicates that the discharge pressure (Pd) is about 6 kg/cm$^2$ for a high speed fan operation of 13V. The low speed plot 24a indicates that the discharge pressure (Pd) is about 13 kg/cm$^2$ for a low speed fan operation of 6V. The off plot 26a indicates that the discharge pressure Pd is about 25 kg/cm$^2$ when the fan is off (0V). However, for ambient conditions of 5° C. with 60% relative humidity as indicated, the discharge pressure plots 22a, 24a, 26a converge to about 5 kg/cm$^2$ near 40 KPH, indicating a fan off state 28a where the condenser/radiator fan 60 can be turned off to obtain the maximum fuel economy benefit.

FIG. 3B shows the trend in discharge pressure (Pd) as a function of vehicle speed (Vs) at 10° C. with 60% relative humidity. In the P-Idle condition, the high speed plot 22b indicates that the discharge pressure (Pd) is about 7 kg/cm$^2$ for a high speed fan operation of 13V. The low speed plot 24b indicates that the discharge pressure (Pd) is about 14 kg/cm$^2$ for a low speed fan operation of 6V. The off plot 26b indicates that the discharge pressure (Pd) is again about 25 kg/cm$^2$ when the fan is off (0V). However, for the ambient conditions of 10° C. with 60% relative humidity as indicated, the discharge pressure plots 22b, 24b, 26b converge to about 6 kg/cm$^2$ near 40 KPH, so that the fan off state 28b can be again set to this speed to obtain the maximum fuel economy benefit.

FIG. 3C shows the trend in discharge pressure (Pd) as a function of vehicle speed (Vs) at 15° C. with 60% relative humidity. In the P-Idle condition, the high speed plot 22c indicates that the discharge pressure (Pd) is about 8 kg/cm$^2$ for a high speed fan operation of 13V. The low speed plot 24c indicates that the discharge pressure (Pd) is about 14 kg/cm$^2$ for a low speed fan operation of 6V. The off plot 26c indicates that the discharge pressure (Pd) is again about 25 kg/cm$^2$ when the fan is off (0V). However, for the ambient conditions of 15° C. with 60% relative humidity as indicated, the discharge pressure plots 22c, 24c, 26c converge to about 7 kg/cm² near 40 KPH, so that the fan off state 28c can still be set at this speed to obtain the maximum fuel economy benefit.

FIG. 3D shows the trend in discharge pressure (Pd) as a function of vehicle speed (Vs) at 20° C. with 60% relative humidity. In the P-Idle condition, the high speed plot 22d indicates that the discharge pressure (Pd) is about 10 kg/cm² for a high speed fan operation of 13V. The low speed plot 24d indicates that the discharge pressure (Pd) is about 18 kg/cm² for a low speed fan operation of 6V. The off plot 26d indicates that the discharge pressure (Pd) is still about 25 kg/cm² when the fan is off (0V). However, for the ambient conditions of 20° C. with 60% relative humidity as indicated, the discharge pressure plots 22d, 24d, 26d converge above 60 KPH. However, the discharge pressure values are within an acceptable range at about 8 kg/cm² at 40 KPH so that the fan off state 28d can still be maintained at this speed to obtain the maximum fuel economy benefit.

FIG. 3E shows the trend in discharge pressure (Pd) as a function of vehicle speed (Vs) at 25° C. with 60% relative humidity. In the "P-Idle" condition, the high speed plot 22e indicates that the discharge pressure (Pd) is about 12 kg/cm² for a high speed fan operation of 13V. The low speed plot 24e indicates that the discharge pressure (Pd) is about 25 kg/cm² for a low speed fan operation of 6V. The off plot 26e indicates that the discharge pressure Pd is still about 25 kg/cm² when the fan is off (0V). For the ambient conditions of 25° C. with 60% relative humidity as indicated, the discharge pressure plots 22e, 24e, 26e converge around 100 KPH. However, the discharge pressure values are sufficiently with the same range around 12 kg/cm² at 60 KPH so that the fan off state 28e can be set at this speed to obtain the maximum fuel economy benefit.

FIG. 3F shows the trend in discharge pressure (Pd) as a function of vehicle speed (Vs) at 30° C. with 60% relative humidity. In the P-Idle condition, the high speed plot 22f indicates that the discharge pressure (Pd) is about 15 kg/cm² for a high speed fan operation of 13V. The low speed plot 24f indicates that the discharge pressure Pd is again about 25 kg/cm² for a low speed fan operation of 6V. The off plot 26f indicates that the discharge pressure (Pd) is still about 25 kg/cm² when the fan is off (0V). For the ambient conditions of 30° C. with 60% relative humidity as indicated, the discharge pressure plots 22f, 24f, 26f converge beyond 100 KPH. However, the discharge pressure values are still within a sufficiently acceptable range at about 13 kg/cm² at 60 KPH so that the fan off state 28f can be maintained at this speed to obtain the maximum fuel economy benefit.

FIG. 3G shows the trend in discharge pressure (Pd) as a function of vehicle speed (Vs) at 40° C. with 20% relative humidity. In the P-Idle condition, the high speed plot 22g indicates that the discharge pressure Pd is about 18 kg/cm² for a high speed fan operation of 13V. The low speed plot 24g indicates that the discharge pressure (Pd) is still about 25 kg/cm² for a low speed fan operation of 6V. The off plot 26g indicates that the discharge pressure (Pd) is still about 25 kg/cm² with the fan off (0V). For the ambient conditions of 40° C. with a 20% relative humidity as indicated, the discharge pressure plots 22g, 24g, 26g converge at about 14 kg/cm² beyond 100 KPH. The fan off state 28g can be set to this speed to obtain the maximum fuel economy benefit.

It will be appreciated from the foregoing that the control strategy depicted in FIG. 2 is rather basic. In a further embodiment, described hereinafter, the control scheme is enhanced by controlling the condenser/radiator cooling fan 60 in response to at least condenser discharge pressure in addition to vehicle speed and ambient temperature to provide a more condition appropriate response.

Figure 1:
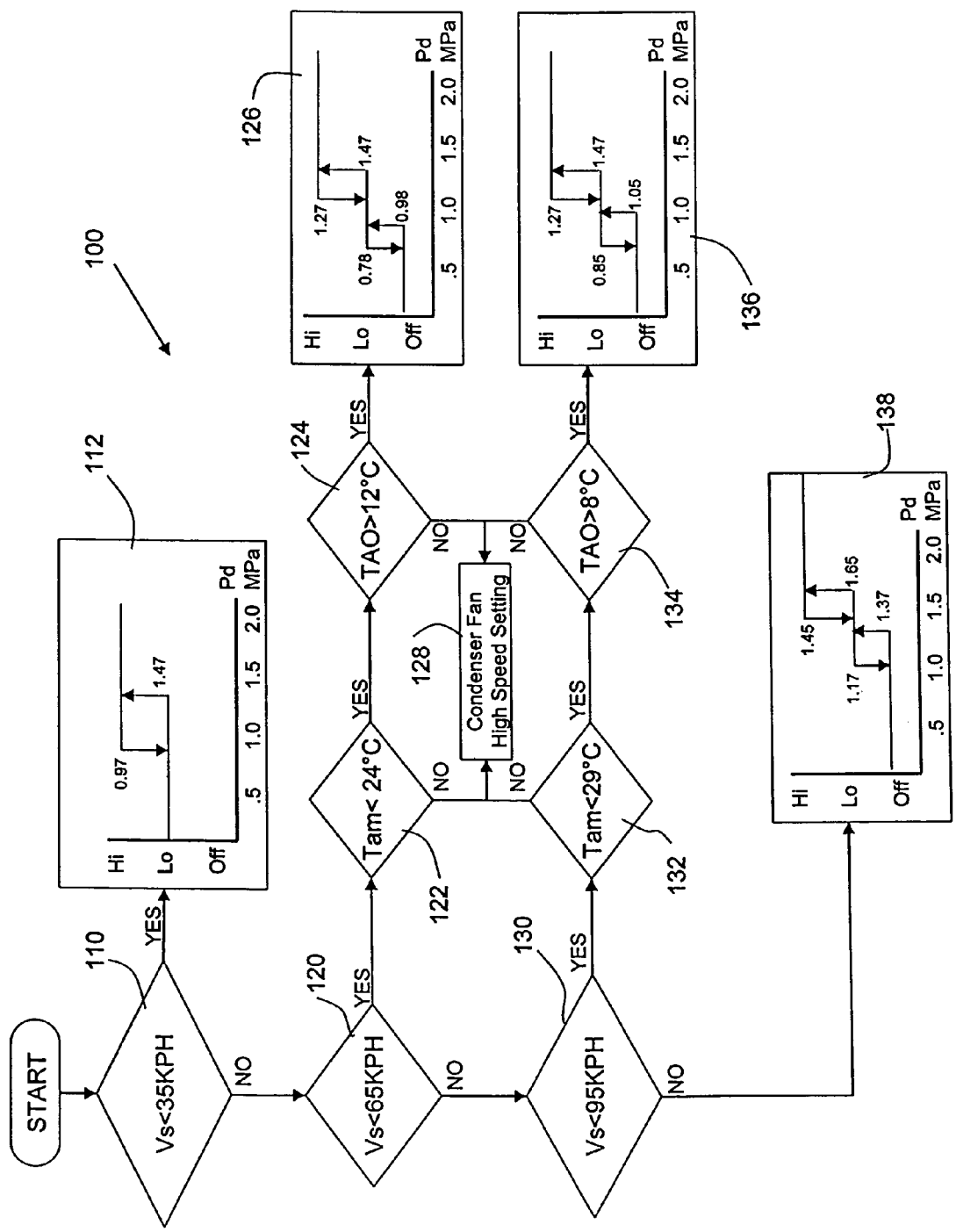
FIG. 1 shows a control logic scheme for selectively controlling the operation of a condenser/radiator fan in accordance with one of the preferred embodiments of the present invention.

In accordance with a further embodiment of the present invention, the ambient temperature, condenser discharge pressure, vehicle speed and outlet temperature are monitored and used to control operation of the condenser fan 60. FIG. 1 is a flow chart showing the control logic 100 of the present method of controlling the condenser/radiator fan 60. It should be appreciated that the invention is in no way limited to these particular parameters, and that a condenser/radiator fan can be operated in response to these parameters, or any and all combinations thereof, and may include other variables without departing from the invention.

In an initial step 110, a vehicle speed (Vs) determination is made. If the vehicle speed is slower than 35 KPH, the discharge pressure of the air conditioning condenser is measured and used to determine the operating speed or voltage of the condenser fan 60. In this low speed range, a condenser/radiator fan speed control decision (step 112) is made by the controller 62 based solely upon measured refrigerant discharge pressure. As shown in the figure, the condenser/radiator fan would be operated at a low speed (6V) for condenser discharge pressures Pd up to about 1.47 MPa. For all higher discharge pressures, the condenser/radiator fan is operated at high speed (13V). For circumstances in which the condenser discharge pressure decreases to about 0.97 MPa while the condenser/radiator fan is operated at high speed (13V) the condenser/radiator fan 60 returns to low speed operation (6V). Thus, there is a hysteresis loop in the condenser/radiator fan speed control to prevent rapid cycling of the fan speed between high and low settings.

Should the vehicle speed be greater than 35 KPH then, in a subsequent step 120, another vehicle speed determination is made. If the vehicle is determined to be moving slower than 65 KPH, the vehicle is considered to be within a first intermediate range of vehicle speeds, associated with a respective ambient temperature range and a respective outlet temperature range. At this point, the ambient temperature (Tam) of the air surrounding the vehicle is measured and an ambient temperature evaluation (step 122) is made. If, in step 122, it is determined that the ambient temperature is greater than a first ambient temperature which, in this case is 24° C. (i.e. a hot ambient temperature condition prevails for that particular vehicle speed) the condenser/radiator fan 60 is operated at high speed (13V) (step 128). On the other hand, in step 122, if the ambient temperature is less than 24° C., then, in step 124, operation of the condenser/radiator fan 60 depends upon the temperature at outlet (TAO), i.e. the temperature at the outlet of the air conditioning vents in the vehicle interior or cabin.

In this regard it is noted that TAO is a calculated value of outlet temperature that is well known in the art and may be based upon a number of parameters, such as sensed cabin temperature, solar load, ambient temperature, etc., but is primarily based upon the desired cabin temperature setpoint input by the user. It is also known in the art that the calculated outlet temperature TAO is commonly used in the automatic mode of operation to control fan speed and vent selection and, as will be seen in the following, this control setting is modified in some portions of the control system to provide for improved response.

If, in step 122, it is determined that ambient temperature (Tam) is less than 24° C., then, in step 124, it is determined whether the TAO is less than 12° C. If the TAO is found to be less than 12° C., this corresponds to a high air conditioning demand and the condenser/radiator fan 60 is operated at high speed (13V). On the other hand, if TAO is greater than 12° C., the condenser/radiator fan speed control decision is made on the basis of a measured discharge pressure associated with this speed range in step 126. As shown in the figure, the condenser/radiator fan is turned off (0V) for condenser discharge pressures (Pd) up to about 0.98 MPa. As discharge pressures increase above 0.98 MPa, the condenser/radiator fan is operated at low speed (6V). When discharge pressures increase above 1.47 MPa, the condenser/radiator fan operates at high speed (13V). Further, while operating at high speed (13V) and pressure drops below 1.27 MPa, the fan operation switches from high-speed (13V) to low-speed (6V). Should sensor condenser discharge pressure drop below 0.78 MPa while the condenser/radiator fan is at low speed, the condenser/radiator fan switches from low-speed (6V) to off (0V).

If in step 120 it is determined that the vehicle speed (Vs) is greater than 65 KPH then, in a further subsequent speed determination step (step 130), the vehicle is compared with a high speed setpoint, which is 95 KPH in the illustrated embodiment. If the vehicle is determined to be moving slower than 95 KPH (i.e. 65>Vs>95 KPH), it is considered to be within a second intermediate range of vehicle speeds, associated with respective ambient temperature and outlet temperature ranges, and the ambient temperature (Tam) of the air surrounding the vehicle is measured in step 132. If, in step 132, it is determined that the ambient temperature is greater than 29° C., a hot ambient temperature condition prevails for that particular vehicle speed, and the controller 62 operates the condenser/radiator fan 60 at high speed (13V) (step 128). On the other hand, if, in step 132 it is determined that the ambient temperature is less than 29° C., the controller bases the condenser/radiator fan speed control decision on TAO in step 134. If, in step 134, it is found that the TAO is less than 8° C., a high air conditioning demand exists and the condenser/radiator fan 60 is set directly to the high speed operation (13V) in step 128. On the other hand, if, in step 134, it is found that the TAO is greater than 8° C., a more moderate air conditioning demand exists, and the condenser/radiator fan speed is controlled based upon the condenser discharge pressure (Pd) associated with this speed range in step 136.

With reference to step 136, the condenser/radiator fan is turned off (0V) for condenser discharge pressures Pd up to about 1.05 MPa. For discharge pressures between 1.05 and 1.47 MPa, the condenser/radiator fan is operated at low speed (6V). For discharge pressures above 1.47 MPa, the condenser/radiator fan is operated at high speed (13V). If the discharge pressure drops below 1.27 MPa while the condenser/radiator fan is operated at high speed (13V) the fan operation switches from high-speed to low-speed (6V). Similarly, if the discharge pressure falls to about 0.85 MPa while the condenser/radiator fan is operated at low speed, the fan operation switches from low-speed to off (0V).

Returning to step 130, if it is determined that the vehicle speed (Vs) is greater than the high speed setpoint (i.e., 95 KPH) then, in step 138, the condenser/radiator fan speed is controlled based entirely upon the refrigerant discharge pressure (Pd). More specifically, the condenser/radiator fan is turned off (0V) for condenser discharge pressures Pd up to about 1.37 MPa. For discharge pressures between 1.37 and 1.65 MPa, the condenser fan is operated at low speed (6V). For discharge pressures above 1.65 MPa, the condenser/radiator fan is operated at high speed (13V). If the discharge pressure drops below 1.45 MPa while the condenser/radiator fan is operated at high speed (13V), the fan operation switches from high-speed to low-speed (6V). Similarly, if the discharge pressure falls to about 1.17 MPa while the condenser/radiator fan is operated at low speed, the fan operation switches from low-speed to off (0V).

Although it is preferred that a pair of condenser/radiator cooling fans be used, a single fan or more than two fans could be used. The condenser/radiator fan(s) are used for the air conditioning condenser and the cooling system, e.g. for cooling water temperature during vehicle operation and while turned off (i.e. "hot restart"). The present control system and method gives priority to the cooling system requirements, and therefore would not turn off the fan(s) if an undesirable hot water temperature is reached. Therefore, the present method will not negatively impact the performance of other vehicle systems. By controlling the speed of the condenser/radiator fan in response to refrigerant load and environmental variables, the present invention offers an increase in fuel efficiency without compromising system performance or other quality factors. In this way, the present invention offers new and unexpected benefits not obtainable with previous type systems.

As described hereinabove, the present invention therefore solves many problems associated with previous type methods and implementations. However, it will be appreciated that various changes in the details, materials and arrangements of parts which have been herein described and illustrated in order to explain the nature of the invention may be made by those skilled in the art within the principle and scope of the invention will be expressed in the appended claims.

What is claimed is:

1. A method for controlling a condenser cooling fan that cooperates with an air conditioning condenser in a vehicle comprising the steps of:
    determining a speed of the vehicle;
    determining a discharge pressure of the air conditioning condenser;
    measuring an ambient temperature of air surrounding the vehicle:
    determining an outlet temperature of a vehicle air conditioning system; and
    controlling an operative state of the condenser cooling fan as a function of vehicle speed, condenser discharge pressure, and at least one of the ambient temperature of air surrounding the vehicle and the outlet temperature of the vehicle air conditioning system, wherein the step of controlling comprises operating the condenser cooling fan at one of a plurality of fan speeds, each of said plurality of fan speeds corresponding to a range of discharge pressures.

2. The method of claim 1, wherein, in a predetermined low range of vehicle speeds, the step of controlling comprises operating the cooling fan in a selected one of: high speed corresponding to a first range of discharge pressures and low speed corresponding to a second range of discharge pressures.

3. The method of claim 1, wherein, in a predetermined high range of vehicle speeds, the step of controlling comprises operating the condenser cooling fan at high speed corresponding to a first range of discharge pressures, low speed corresponding to a second range of discharge pressures, and off corresponding to a third range of discharge pressures.

4. The method of claim 1, wherein, in a predetermined intermediate range of vehicle speeds, the step of controlling comprises:
    determining whether measured ambient temperature is above a predetermined ambient temperature, wherein, if ambient temperature is above the predetermined ambient temperature, operating the condenser cooling fan at the high speed; and if ambient temperature is below the predetermined ambient temperature, controlling the operative state of the condenser cooling fan in response to the determined outlet temperature of the vehicle air conditioning system.

5. The method of claim 4, wherein the step of controlling the operative state of the condenser cooling fan in response to the determined outlet temperature of the vehicle air conditioning system comprises:

determining whether the determined outlet temperature is above a predetermined outlet temperature, wherein, if the determined outlet temperature is below the predetermined outlet temperature, operating the condenser cooling fan at high speed; and if determined outlet temperature is above the predetermined outlet temperature, operating the condenser cooling fan at one of: high speed; low speed; and off, in dependence upon the measured respective discharge pressure.

6. A method for controlling a condenser cooling fan that cooperates with an air conditioning condenser in a vehicle comprising the steps of:

measuring a speed of the vehicle;

determining a discharge pressure of the air conditioning condenser;

measuring an ambient temperature of air surrounding the vehicle;

determining an outlet air temperature of a vehicle air conditioning system;

operating the condenser cooling fan in at least one of a plurality of fan speeds based upon vehicle speed and at least one of ambient temperature and determined outlet air temperature.

7. The method of claim 6, wherein the at least one fan speed comprises a high speed; a low speed; and off.

8. The method of claim 6, wherein, in a predetermined low range of vehicle speeds, the step of operating is also based upon discharge pressure and comprises operating the condenser cooling fan in a selected one of: high speed corresponding to a first range of discharge pressures and low speed corresponding to a second range of discharge pressures.

9. The method of claim 6, wherein, in a predetermined high range of vehicle speeds, the step of controlling is also based upon discharge pressure and comprises operating the condenser cooling fan at high speed corresponding to a first range of discharge pressures, low speed corresponding to a second range of discharge pressures, and off corresponding to a third range of discharge pressures.

10. The method of claim 6, wherein, in a predetermined intermediate range of vehicle speeds, the step of operating comprises:

determining whether measured ambient temperature is above a predetermined ambient temperature, wherein, if ambient temperature is above the predetermined ambient temperature, operating the condenser cooling fan at high speed;

if ambient temperature is below the predetermined ambient temperature, operating the condenser cooling fan based upon the determined outlet air temperature of the vehicle air conditioning system.

11. The method of claim 10 wherein the step of operating the condenser cooling fan in response to the determined outlet air temperature of the vehicle air conditioning system further comprises:

determining whether determined outlet air temperature is above a predetermined outlet air temperature, wherein, if determined outlet air temperature is below the predetermined outlet air temperature, operating the condenser cooling fan at high speed;

if determined outlet air temperature is above the predetermined outlet air temperature, operating the condenser cooling fan in a selected one of: high speed; low speed; and off, based upon the discharge pressure.

12. A system for controlling a condenser cooling fan that cooperates with an air conditioning condenser in a vehicle comprising:

a speed sensor for measuring a speed of the vehicle;

a temperature sensor for measuring an ambient temperature of air surrounding the vehicle;

means for calculating an outlet air temperature of a vehicle air conditioning system;

a controller for operating the condenser cooling fan in at least one of a plurality of fan speeds based upon vehicle speed and at least one of sensed ambient temperature and calculated outlet air temperature.

13. The system of claim 12, wherein the at least one fan speed comprises a high speed; a low speed; and off.

14. The system of claim 12, further comprising a pressure sensor for determining a discharge pressure of the air conditioning condenser; and, wherein the fan speed is further based upon sensed discharge pressure.

* * * * *